(12) United States Patent
Takada et al.

(10) Patent No.: US 10,320,640 B2
(45) Date of Patent: Jun. 11, 2019

(54) COMMUNICATION SYSTEM, ABNORMALITY DETECTION DEVICE AND ABNORMALITY DETECTION METHOD

(71) Applicants: National University Corporation Nagoya University, Nagoya-shi, Aichi (JP); AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Hiroaki Takada, Nagoya (JP); Ryo Kurachi, Nagoya (JP); Hiroshi Ueda, Yokkaichi (JP)

(73) Assignees: National University Corporation Nagoya University, Nagoya-shi, Aichi (JP); AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 11 days.

(21) Appl. No.: 15/542,202

(22) PCT Filed: Jan. 13, 2016

(86) PCT No.: PCT/JP2016/050826
§ 371 (c)(1),
(2) Date: Jul. 7, 2017

(87) PCT Pub. No.: WO2016/114301
PCT Pub. Date: Jul. 21, 2016

(65) Prior Publication Data
US 2017/0359241 A1 Dec. 14, 2017

(30) Foreign Application Priority Data

Jan. 14, 2015 (JP) .................. 2015-005260

(51) Int. Cl.
*H04L 12/26* (2006.01)
*H04L 12/46* (2006.01)

(52) U.S. Cl.
CPC ...... *H04L 43/0823* (2013.01); *H04L 12/4625* (2013.01)

(58) Field of Classification Search
CPC .................................................. H04L 43/0823
(Continued)

(56) References Cited

U.S. PATENT DOCUMENTS

2008/0043830 A1\* 2/2008 Simpson ........... H04L 25/03057
375/233
2014/0380416 A1 12/2014 Adachi

FOREIGN PATENT DOCUMENTS

| JP | 2005-333222 | 12/2005 |
| JP | 2009-181431 | 8/2009 |
| JP | 2015-005829 | 1/2015 |

OTHER PUBLICATIONS

Matsumoto, et al. "How to Enhance Integrity of Controller Area Network Against Electrical Data Forgery" Computer Security Symposium 2014, Oct. 22-24, 2014.
(Continued)

*Primary Examiner* — Samina F Choudhry
(74) *Attorney, Agent, or Firm* — Honigman LLP (57) ABSTRACT

Provided are a communication system, an abnormality detection device and an abnormality detection method that detects abnormality concerning communication such as information forged by utilizing a difference in timings of sampling between multiple communication devices. For the system configuration where ECUs transmit and receive
(Continued)

information through a common communication line, abnormality detection related to communication is performed by a monitoring device connected to the communication line. Each ECU receives information by sampling once at a predetermined timing during a transmission period of one-bit information. The ECUs may also be allowed to perform sampling at different timings. The monitoring device samples the voltage of the communication line multiple times over a predetermined monitoring period including a timing of the earliest sampling and a timing of the latest timing performed by the ECUs during the transmission period of one-bit information, and detects abnormality based on the results of multiple times of sampling.

6 Claims, 8 Drawing Sheets

(58) Field of Classification Search
USPC .......................................................... 370/242
See application file for complete search history.

(56) References Cited

OTHER PUBLICATIONS

Search Report for PCT/JP2016/050826, dated Apr. 5, 2016.

* cited by examiner

COMMUNICATION SYSTEM, ABNORMALITY DETECTION DEVICE AND ABNORMALITY DETECTION METHOD

CROSS-REFERENCE TO RELATED APPLICATIONS

This application is the national phase under 35 U. S. C. § 371 of PCT International Application No. PCT/JP2016/050826 which has an International filing date of Jan. 13, 2016 and designated the United States of America.

FIELD

The technology herein relates to a communication system, an abnormality detection device and an abnormality detection method that can detect abnormality concerning communication in a configuration where multiple communication devices are connected to a common communication line.

BACKGROUND

Conventionally, the communication protocol of CAN has widely been employed in communication between multiple electronic control units (ECU) mounted in a vehicle.

A communication system which employs the CAN communication protocol is so configured that multiple ECUs are connected to a common CAN bus, and information is transmitted and received by an ECU at the reception side sampling a signal output by an ECU at the transmission side to the CAN bus. Moreover, the ECU at the transmission side outputs signals to the CAN bus while sampling signals on the CAN bus to detect the presence/absence of a change related to information transmitted by itself.

Tsutomu Matsumoto, Taiki Kodatsu, Yuu Tsuchiya, Yoshifumi Nakayama and Katsunari Yoshioka "How to Enhance Integrity of Controller Area Network Against Electrical Data Forgery" Computer Security Symposium 2014, Oct. 22-24, 2014 (Non-Patent Document 1) has pointed out that an ECU at the reception side may receive forged information without an ECU at the transmission side knowing it, by intentionally changing signals on the CAN bus only for a short period during which sampling is performed by the ECU at the reception side, in the case where the timing of sampling signals on the CAN bus is different between the ECU at the transmission side and the ECU at the reception side.

SUMMARY

For example, if unauthorized equipment is connected to a CAN bus located in a vehicle and information is forged for a specific ECU by the method described in Non-Patent Document 1, operation errors may occur in various types of electronic equipment mounted in the vehicle. Thus, a technique for detecting or preventing such information forgery is desired.

The present disclosure has been made in view of the circumstances described above, and aims to provide a communication system, an abnormality detection device and an abnormality detection method that can detect abnormality concerning communication such as information forged by utilizing a difference in the timings of sampling between multiple communication devices.

A communication system according to an aspect of the present disclosure comprises a plurality of communication devices that are connected to each other via a common communication line to transmit and receive binary information through the communication line, each of the communication devices including a reception part receiving information by sampling voltage of the communication line once at a predetermined timing during a period of transmitting one-bit information, and the plurality of communication devices being allowed to perform sampling at different timings. The communication system further comprises an abnormality detection device connected to the communication line and including: a sampling part sampling voltage of the communication line multiple times over a predetermined period including a timing of the earliest sampling and a timing of the latest timing in the sampling performed by the plurality of communication devices; and a detection part detecting abnormality concerning communication based on the results of multiple times of sampling performed by the sampling part.

Moreover, in the communication system according to another aspect of the present disclosure, the sampling part periodically performs sampling multiple times during the predetermined period, and the detection part detects abnormality concerning communication if a sampling result of sampling performed by the sampling part is different from a previous sampling result.

The communication system according to another aspect of the present disclosure further comprises a notification part notifying the plurality of communication devices that abnormality is detected if the detection part detects abnormality.

Moreover, in the communication system according to another aspect of the present disclosure, the notification part performs predetermined information transmission to the communication line if the detection part detects abnormality, and the information transmission blocks the reception of information by the plurality of communication devices.

Furthermore, the abnormality detection device according to another aspect of the present disclosure detects abnormality concerning communication, in a communication system comprising a plurality of communication devices connected to each other via a common communication line to transmit and receive binary information through the communication line, each of the communication devices including a reception part receiving information by sampling voltage of the communication line once at a predetermined timing during a transmission period of one-bit information, and the plurality of communication devices being allowed to perform sampling at different timings. The abnormality detection device comprises: a sampling part sampling voltage of the communication line multiple times over a predetermined period including a timing of the earliest sampling and a timing of the latest timing in the sampling performed by the plurality of communication devices; and a detection part detecting abnormality concerning communication based on the results of multiple times of sampling performed by the sampling part.

Furthermore, the abnormality detection method according to another aspect of the present disclosure detects abnormality concerning communication, in a communication system comprising a plurality of communication devices connected to each other via a common communication line to transmit and receive binary information through the communication line, each of the communication devices including a reception part receiving information by sampling voltage of the communication line once at a predetermined timing during a transmission period of one-bit information, and the plurality of communication devices being allowed to perform sampling at different timings. The abnormality detection method comprises sampling voltage of the communication line multiple times over a predetermined period including a timing of the earliest sampling and a timing of the latest timing in the sampling performed by the plurality of communication devices; and detecting abnormality concerning communication based on the results of multiple times of sampling.

In the communication system according to an aspect of the present disclosure, for the system configuration where a plurality of communication devices transmit and receive information through a common communication line, abnormality related to communication is detected by the abnormality detection device connected to the communication line. Each of the communication devices receives information by sampling once at a predetermined timing during a transmission period of one-bit information. The plurality of communication devices may however be allowed to perform sampling at different timings. The abnormality detection device samples the voltage of the communication line multiple times over a predetermined period including a timing of the earliest sampling and a timing of the latest sampling performed by the plurality of communication devices during the transmission of one-bit information. The abnormality detection device may monitor a change in voltage of the common communication line over a period in which the plurality of communication devices included in the communication system may perform sampling and detect abnormality based on the results of multiple times of sampling.

According to another aspect of the present disclosure, in the case where the abnormality detection device periodically performs sampling multiple times during a predetermined period and if a current sampling result is different from a previous sampling result, i.e. if a signal on the communication line changes during the predetermined period, it is determined that abnormality occurs in communication. Thus, information forgery may be detected by changing a signal to be in accordance with the timing of sampling performed by a specific communication device.

According to a further aspect of the present disclosure, upon detecting abnormality concerning communication, the abnormality detection device notifies the plurality of communication devices thereof. The abnormality detection device may notify the communication devices of the occurrence of abnormality by performing predetermined information transmission by, for example, outputting an error frame in the CAN protocol to the communication line. According to the present communication system, the abnormality detection device transmits information for notification of abnormality so as to block the reception of information by each communication device in the communication system. This can prevent the communication device from receiving forged information.

According to an aspect of the present disclosure, abnormality concerning communication such as information forged by utilizing a difference in sampling timings between communication devices may be detected by the abnormality detection device.

The above and further objects and features will more fully be apparent from the following detailed description with accompanying drawings.

DETAILED DESCRIPTION

The present disclosure will specifically be described below with reference to the drawings illustrating the embodiments thereof.

<System Configuration>

Figure 1:
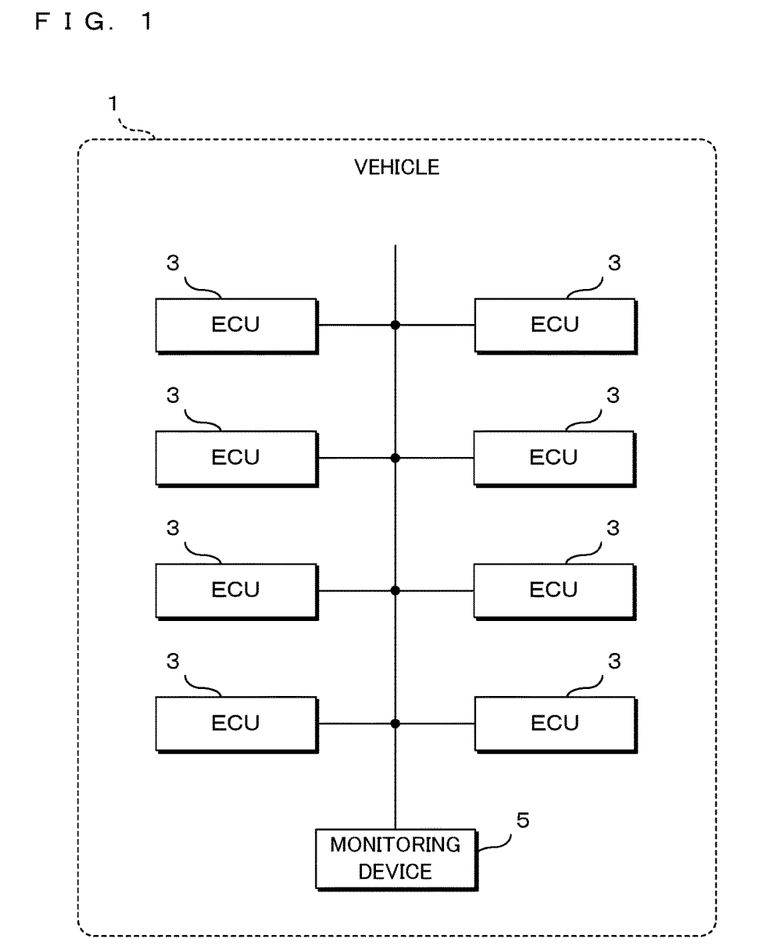
FIG. 1 is a schematic diagram illustrating the configuration of a communication system according to an embodiment of the present disclosure.

FIG. 1 is a schematic diagram illustrating a configuration of a communication system according to Embodiment 1. The communication system according to the present embodiment is configured to include multiple ECUs 3 mounted to a vehicle 1 and one monitoring device 5. The ECUs 3 and the monitoring device 5 are connected with one another via a common communication line installed in the vehicle 1, and may transmit and receive messages to/from one another. According to the present embodiment, a CAN bus is employed as the communication line, and the ECUs 3 as well as monitoring device 5 perform communication according to the CAN protocol. The ECUs 3 may be, for example, various electronic control devices such as an engine ECU controlling the engine of the vehicle 1, a body ECU controlling an electric component of a vehicle body, an ABS-ECU performing control related to an antilock brake system (ABS) or an air bag ECU controlling an air bag of the vehicle 1. The monitoring device 5 is a device for monitoring unauthorized message transmission to an in-vehicle network. The monitoring device 5 may be provided as a device dedicated for monitoring, for example, configured with a monitoring function added to a device such as a gateway, for example, or configured with a monitoring function added to any one of the ECUs 3, for example.

Figure 2:
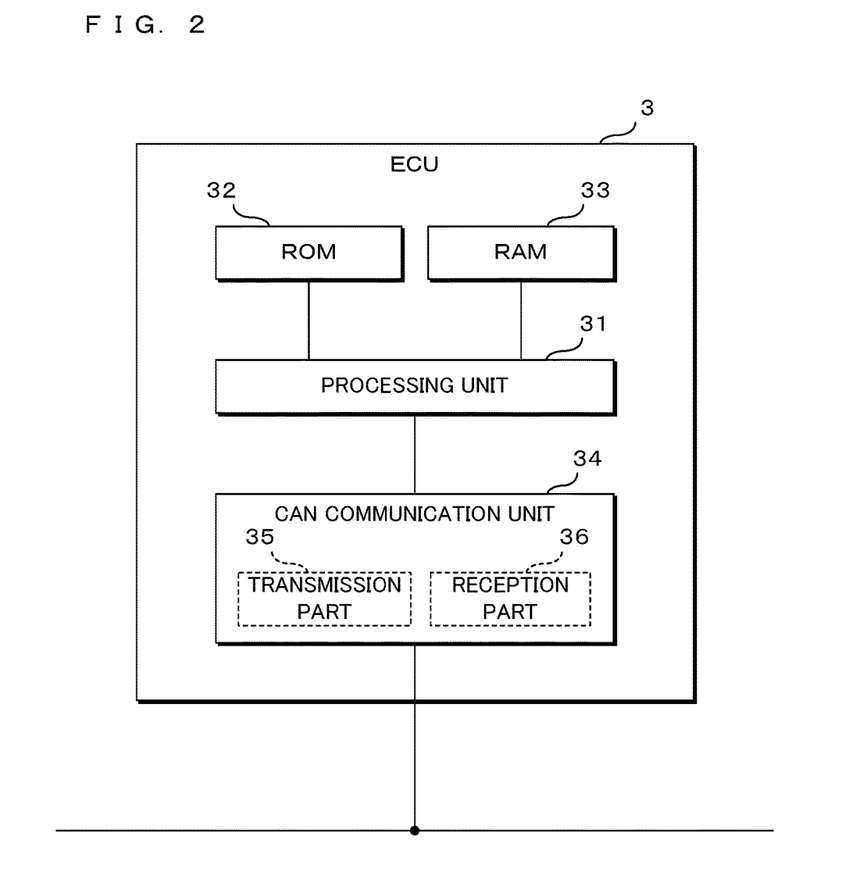
FIG. 2 is a block diagram illustrating a configuration of an ECU.

FIG. 2 is a block diagram illustrating a configuration of the ECU 3. In FIG. 2, for the ECUs 3 included in the vehicle 1, the blocks related to communication are extracted and illustrated, while blocks related to vehicle control specific to each ECU 3 are not illustrated. The blocks illustrated in FIG. 2 are provided in common to the multiple ECUs 3. An ECU 3 according to the present embodiment is configured to comprise a processing unit (processor) 31, a read only memory (ROM) 32, a random access memory (RAM) 33, a CAN communication unit (transceiver) 34 and so forth. The processing unit 31 is configured with an arithmetic processing device such as a central processing unit (CPU) or a micro-processing unit (MPU). The processing unit 31 reads out and executes a program stored in the ROM 32 to perform various information processing, control processing or the like concerning the vehicle 1.

The ROM 32 is configured with a non-volatile memory element such as a flash memory or an electrically erasable programmable ROM (EEPROM). The ROM 32 stores therein a program executed by the processing unit 31 and various types of data required for processing performed thereby. The program and data stored in the ROM 32 are different for each ECU 3. The RAM 33 is configured with a data-rewritable memory element such as a static random access memory (SRAM) or a dynamic random access memory (DRAM). The RAM 33 stores various types of data generated by the processing performed by the processing unit 31.

The CAN communication part 34 performs communication with another ECU 3 or the monitoring device 5 through the CAN bus in accordance with the CAN communication protocol. The CAN communication unit 34 includes a transmission part 35 which converts information for transmission that has been sent from the processing unit 31 into a signal according to the CAN communication protocol and outputs the converted signal to the CAN bus, to transmit information to another ECU 3 or the monitoring device 5. The CAN communication unit 34 further includes a reception part 36 which obtains a signal output by another ECU 3 or the monitoring device 5 by sampling the potential at the CAN bus and receives information by converting the signal into binary information in accordance with the CAN communication protocol. The reception part 36 sends the received information to the processing unit 31.

Moreover, the CAN communication unit 34 performs, in the case where collision occurs between its own message transmission and the message transmission by another ECU 3 or the monitoring device 5, processing of arbitration as to which message is to be transmitted first, so-called arbitration processing. For the message transmitted by each of the ECUs 3, an ID is determined in advance in accordance with the type of the message. The ID is information treated as a numeric value, and the smaller the value is, the higher the priority for message transmission is. In the communication system, therefore, if transmission of multiple messages are collided on the CAN bus, a message with the highest priority is transmitted, and after the transmission of this message is completed, another message is transmitted. As the arbitration processing performed by the CAN communication unit 34 is an existing technique, the description of detailed processing procedure thereof is not described here.

Figure 3:
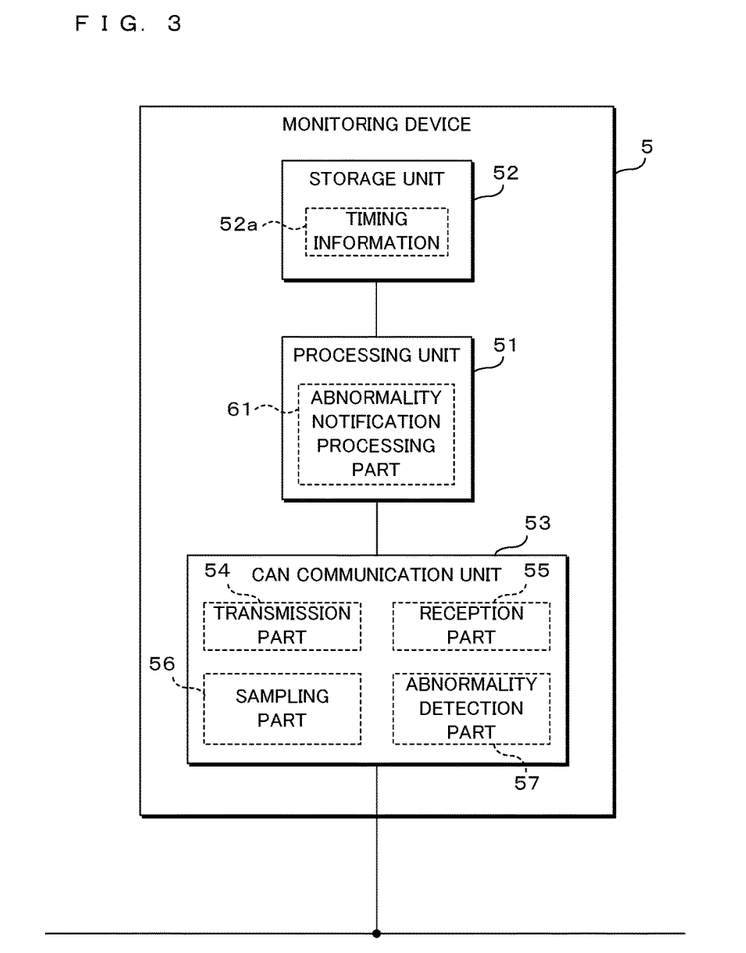
FIG. 3 is a block diagram illustrating a configuration of a monitoring device.

FIG. 3 is a block diagram illustrating a configuration of the monitoring device 5. The monitoring device 5 is configured to include a processing unit (processor) 51, a storage unit 52, a CAN communication unit (transceiver) 53 and so forth. The processing unit 51 is configured with an arithmetic processing device such as a CPU or MPU, which performs processing of monitoring the behavior, communication and the like of ECUs 3 in the vehicle 1 by reading out and executing a program stored in the storage unit 52. The storage unit 52 is configured with a data rewritable non-volatile memory element such as a flash memory or an EEPROM. In the present embodiment, the storage unit 52 stores information related to the timing of sampling signals on the CAN bus at the time when each ECU 3 included in the communication system receives a message, as timing information 52a.

The CAN communication unit 53 performs communication with the ECUs 3 through the CAN bus in accordance with the CAN communication protocol. The CAN communication unit 53 includes a transmission part 54 which converts information for transmission that has been sent from the processing unit 51 into a signal according to the CAN communication protocol and outputs the converted signal to the CAN bus, to transmit information to an ECU 3. The CAN communication unit 53 further includes a reception part 55 which obtains a signal output by the ECU 3 by sampling the potential at the CAN bus and receives information by converting the signal into binary information in accordance with the CAN communication protocol. The reception part 55 sends the received information to the processing unit 51.

The CAN communication unit 53 in the monitoring device 5 according to the present embodiment further includes a sampling part 56 and an abnormality detection part 57 as functional blocks concerning detection of communication abnormality in the communication system. The sampling part 56 samples signals on the CAN bus multiple times during the transmission period of one bit for the message transmitted and received via the CAN bus in the communication system. It is noted that the ECU 3 communicating in accordance with the conventional CAN protocol performs sampling once in the one-bit period of a message, and receives the message based on the result of the sampling. In the communication system according to the present embodiment, the monitoring device 5 performs sampling multiple times during the one-bit period, to obtain a change in a signal during the one-bit period and detect abnormality.

The abnormality detection part 57 in the CAN communication unit 53 performs processing of detecting abnormality of communication in the communication system, based on the results of multiple times of sampling performed by the sampling part 56. According to the present embodiment, the abnormality detection part 57 obtains the result of sampling every time the sampling part 56 performs sampling, and determines whether or not the current sampling result matches with the previous sampling result. If the sampling results match, the abnormality detection part 57 determines that no abnormality occurs, and continues to obtain and compare the sampling results. If, on the other hand, the sampling results do not match, the abnormality detection part 57 determines that abnormality occurs in communication, and notifies the processing unit 51 thereof.

According to the present embodiment, the processing unit 51 in the monitoring device 5 is provided with an abnormality notification processing part 61. The abnormality notification processing part 61 may be configured as a hardware functional block or a software functional block. If the abnormality detection part 57 of the CAN communication unit 53 notifies the abnormality notification processing part 61 that abnormality is detected in communication, the abnormality notification processing part 61 performs processing of notifying each ECU 3, included in the communication system, of the occurrence of abnormality. According to the present embodiment, the abnormality notification processing part 61 makes the CAN communication unit 53 output an error frame to the CAN bus, to notify the ECU 3 of the occurrence of abnormality. Thus, the message (data frame or the like) being transmitted while abnormality occurs in communication is stopped from being transmitted by the error frame in the monitoring device 5. Each ECU 3 that received the error frame discards the message that had been received prior thereto. This can prevent the ECU 3 from receiving any message that can include abnormality.

<Monitor Processing>

In the communication system according to the present embodiment, the monitoring device 5 monitors the presence or absence of abnormality for the message output to the CAN bus by the ECU 3. It is noted that the monitoring device 5 may perform monitoring constantly, for example, or may perform monitoring for transmission of the message attached with a specific ID, for example. In the present embodiment, the monitoring device 5 constantly performs monitoring.

The message transmitted and received in the present communication system is a string of multiple bits of binary digital data, i.e. dominant (0)/recessive (1), and is a so-called data frame or the like of the CAN protocol. In the communication system, a period of transmitting one-bit data included in a message is determined in advance. In the transmission period of one bit, the monitoring device 5 monitors communication abnormality by inspecting whether or not a change occurs in this one-bit data for a predetermined monitoring period which is shorter than the transmission period.

Figure 4:
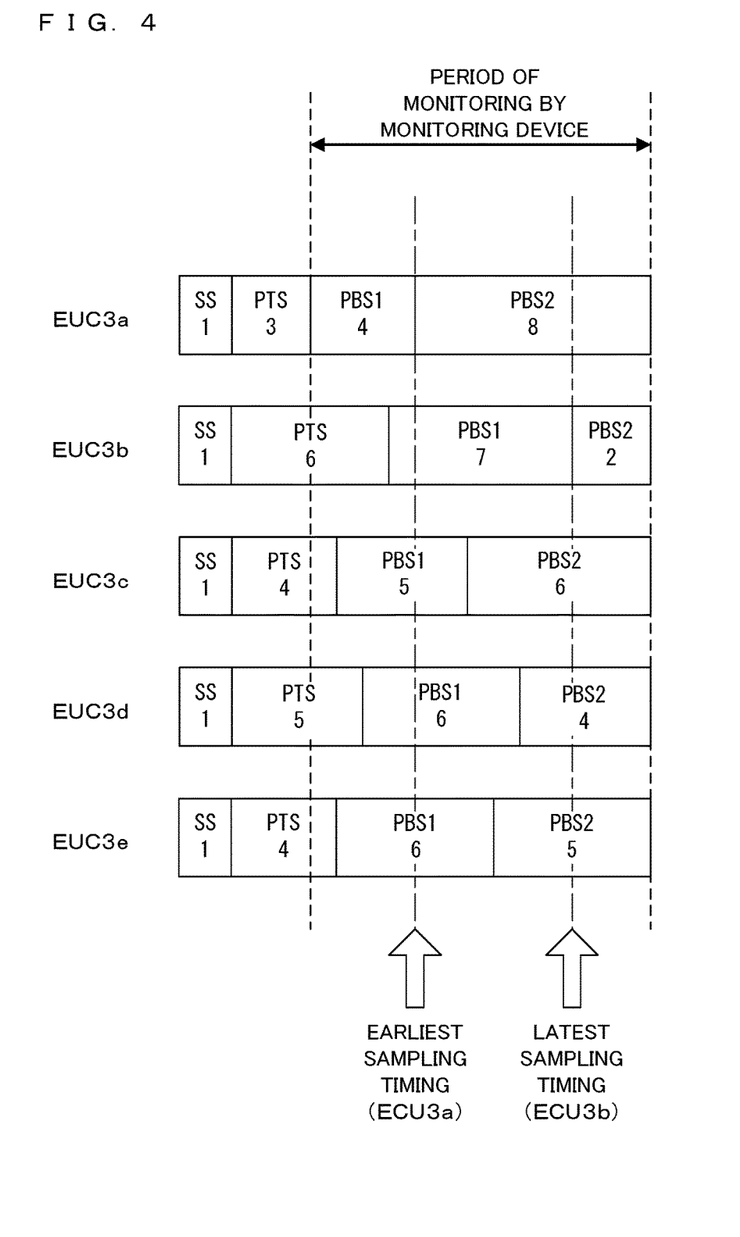
FIG. 4 is a schematic view for illustrating a monitoring period by the monitoring device.

FIG. 4 is a schematic view for illustrating a period of monitoring by the monitoring device 5. One bit in a message according to the CAN protocol is constituted by four periods (segments). That is, one bit of the CAN protocol is constituted by four segments of a synchronization segment (SS), a propagation time segment (PTS), a phase buffer segment 1 (PBS1) and a phase buffer segment 2 (PBS2). The length (time) of each segment is decided as an integer multiple of a reference time Tq (Time Quantum). The reference time Tq corresponds to a cycle of clock signals for sampling, generated by the CAN communication unit 34 of each ECU 3. It is noted that the length of SS is determined as 1 Tq. For each ECU3, different values may be set to the lengths of PTS, PBS1 and PBS2.

SS is a segment for the ECUs 3 to synchronize with each other, and the edge of a signal is expected to be in this segment. PTS is a segment for absorbing the influence of signal delay, noise and the like on the CAN bus. PTS may be set to be in the range of 1 Tq to 8 Tq. PBS1 is a segment for compensating an error in the case where the edge of the signal is not in SS. PBS1 may be set to be in the range of 1 Tq to 8 Tq, and may be extended or shortened by the time corresponding to a synchronization jump width (SJW). PBS2 is a segment which is shortened by the time corresponding to SJW in the case where the edge of the signal is detected early. PBS2 may be set to be in the range of 2 Tq to 8 Tq. It is noted that the timing for sampling performed by the CAN communication unit 34 of each ECU 3 corresponds to the timing of transfer from PBS1 to PBS2.

For example, FIG. 4 shows that five ECUs 3 (hereinafter referred to as ECUs 3a to 3e to distinguish one from another) are included in the communication system according to the present embodiment, illustrating the segment configuration for each of the ECUs 3a to 3e. In the ECU 3a, SS is 1 Tq, PTS is 3 Tq, PBS1 is 4 Tq and PBS2 is 8 Tq long. In the ECU 3b, SS is 1 Tq, PTS is 6 Tq, PBS1 is 7 Tq and PBS2 is 2 Tq long. In the ECU 3c, SS is 1 Tq, PTS is 4 Tq, PBS1 is 5 Tq and PBS2 is 6 Tq long. In the ECU 3d, SS is 1 Tq, PTS is 5 Tq, PBS1 is 6 Tq and PBS2 is 4 Tq long. In the ECU 3e, SS is 1 Tq, PTS is 4 Tq, PBS1 is 6 Tq and PBS2 is 5 Tq long. It is noted that the lengths of these segments are mere examples and are not limited thereto.

In the monitoring device 5 according to the present embodiment, information related to the segment configuration of each of the ECUs 3a to 3e included in the communication system to be monitored is stored in the storage unit 52 as timing information 52a. The CAN communication unit 53 in the monitoring device 5 decides a monitoring period for monitoring communication abnormality based on the timing information 52a stored in the storage unit 52. The timing for sampling performed by the CAN communication unit 34 of each of the ECUs 3a to 3e corresponds to the timing of transfer from PBS1 to PBS2. In the present example, therefore, the sampling by the ECU 3a is the earliest, whereas the sampling by the ECU 3b is the latest. The CAN communication unit 53 in the monitoring device 5 decides a monitoring period to include the earliest sampling timing and the latest sampling timing. In the present embodiment, a period obtained by adding PBS1 to PBS2 for the ECU 3a to which the earliest sampling timing is set is regarded as a monitoring period by the CAN communication unit 53 of the monitoring device 5. It is noted that, in the case where the period of PBS1 or PBS2 is extended or shortened for some reason, the monitoring period is extended or shortened accordingly.

In the case where the ECU 3 transmits a message, the CAN communication unit 53 in the monitoring device 5 monitors each bit of the message during a monitoring period. The sampling part 56 of the CAN communication unit 53 samples a signal on the CAN bus at a frequency of once per 1 Tq in the monitoring period. In the example illustrated in FIG. 4, as the monitoring period corresponds to 4 Tq of PBS1+8 Tq of PBS2, the sampling part 56 performs total of twelve times of sampling during the monitoring period. The sampling result by the sampling part 56 is supplied to the abnormality detection part 57.

The abnormality detection part 57 starts detection processing from the time point when the second sampling result is obtained by the sampling part 56 in the monitoring period. The abnormality detection part 57 determines whether or not the previous sampling result matches with the current sampling result. If the sampling results do not match, the abnormality detection part 57 determines that abnormality occurs in communication, and notifies the processing unit 51 that abnormality is detected. If the sampling results match with each other, the abnormality detection part 57 discards the previous sampling result, stores the current sampling result and continues the abnormality detection processing until the end of the monitoring period.

According to the present embodiment, it is necessary for all of the twelve sampling results obtained by the sampling part 56 to match with each other, i.e., the twelve sampling results need to be either all dominant (0) or all recessive (1). If even one different value is included in the twelve sampling results, the monitoring device 5 determines that abnormality occurs in communication.

The processing unit 51 which has been notified of abnormality detection by the abnormality detection part 57 in the CAN communication unit 53 makes the abnormality notification processing part 61 perform processing of notifying all the ECUs 3 in the communication system of the occurrence of abnormality. According to the present embodiment, the abnormality notification processing part 61 notifies all the ECUs 3 of the occurrence of abnormality by making the CAN communication unit 53 transmit an error frame in the CAN protocol. The error frame is transmitted in a manner of overwriting any message (data frame) being transmitted by the ECU 3. The error frame transmitted by the monitoring device 5 is received by all the ECUs 3 connected via the CAN bus. This can prevent the ECUs 3 from receiving any message in which abnormality is detected.

<State Transition and Flowchart>

Figure 5:
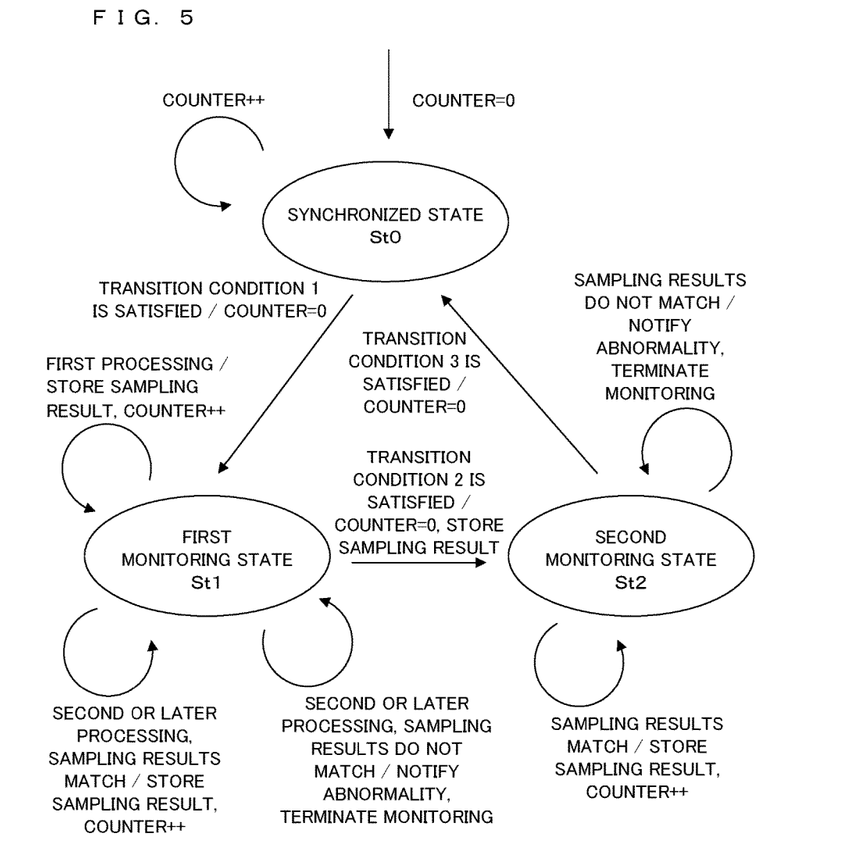
FIG. 5 is a state transition view for illustrating monitor processing performed by the monitoring device.

FIG. 5 is a state transition view for illustrating monitor processing performed by the monitoring device 5. The CAN communication unit 53 of the monitoring device 5 according to the present embodiment performs monitor processing while making transitions among three states of a synchronized state St0, a first monitoring state St1 and a second monitoring state St2. It is noted that the synchronized state St0 corresponds to the periods of SS and PTS in a message, the first monitoring state St1 corresponds to the period of PBS1, and the second monitoring state St2 corresponds to the period of PBS2. The CAN communication unit 53 uses a counter for counting the value of Tq in the monitor processing, which may be implemented by utilizing a storage region such as a register located in the CAN communication unit 53. Moreover, the CAN communication unit 53 performs monitor processing in synchronization with a sampling clock of the cycle Tq, while condition determination, state transition and the like may be carried out for every 1 Tq.

If message transmission to the CAN bus is started, the CAN communication unit 53 initializes the value of the counter to 0, and starts the processing in the synchronized state St0. It is noted that the message transmission for starting the monitor processing by the CAN communication unit 53 may also include, for example, message transmission by an unauthorized device connected to the CAN bus through an unauthorized means, in addition to the message transmission by an authorized ECU 3 mounted to the vehicle 1.

The CAN communication unit 53 in the synchronized state St0 is determined whether or not the transition condition 1 is satisfied. The transition condition 1 is a condition for state transition to the first monitoring state St1, and the present example employs a condition where the value of the counter reaches the total value of Tq of SS and Tq of PTS. If the transition condition 1 is not satisfied, the CAN communication unit 53 increments the value of the counter (adds 1 to the value of the counter), and maintains the synchronized state St0. If the transition condition 1 is satisfied, the CAN communication unit 53 initializes the value of the counter to 0, and makes a transition to the first monitoring state St1.

In the first monitoring state St1, the CAN communication unit 53 determines whether or not the transition condition 2 is satisfied. The transition condition 2 is a condition of making a state transition to the second monitoring state St2, and the present example employs a condition where the value of the counter reaches Tq of PBS1. According to the present embodiment, for the length of each segment of the monitoring device 5, the same value as that for the ECU 3*a* which performs sampling at the earliest timing in the communication system is employed. That is, with reference to FIG. 4, SS in the monitoring device 5 is 1 Tq long, PTS is 3 Tq long, PBS1 is 4 Tq long, and PBS2 is 8 Tq long. Therefore, the transition condition 2 is satisfied when the value of the counter reaches 4. This segment length is however a mere example, and another value may also be applied.

If the transition condition 2 is not satisfied, the CAN communication unit 53 determines whether or not the processing is the first processing in the first monitoring state St1. The CAN communication unit 53 may determine whether or not it is the first processing in accordance with whether the value of the counter is 0 or not. If it is the first processing, the CAN communication unit 53 samples a signal on the CAN bus by the sampling part 56, obtains a sampling result and stores the result in an internal register while incrementing the counter, to maintain the first monitoring state St1.

If it is the second or later processing, the CAN communication unit 53 obtains the result of sampling performed by the sampling part 56, and determines whether or not the previous sampling result matches with the current sampling result. If the sampling results match, the CAN communication unit 53 discards the previous sampling result and stores the current sampling result, while incrementing the counter to maintain the first monitoring state St1. If the sampling results do not match, the CAN communication unit 53 notifies the processing unit 51 that abnormality is detected, and terminates the monitor processing. It is noted that, in the case where the monitor processing is terminated, the CAN communication unit 53 may come out of the state transition illustrated in FIG. 5, or may maintain the first monitoring state St1.

If the transition condition 2 is satisfied, the CAN communication unit 53 initializes the value of the counter to 0, and makes a transition to the second monitoring state St2. In the second monitoring state St2, the CAN communication unit 53 determines whether or not the transition condition 3 is satisfied. The transition condition 3 is a condition of making a state transition to the synchronized state St0, and the present example employs a condition where the value of the counter reaches Tq of PBS2. It is noted that the transition condition 2 in the present embodiment is satisfied when the value of the counter reaches 8.

If the transition condition 3 is not satisfied, the CAN communication unit 53 obtains the result of sampling performed by the sampling part 56, and determines whether or not the previous sampling result matches with the current sampling result. If the sampling results match, the CAN communication unit 53 discards the previous sampling result and stores the current sampling result, while incrementing the counter to maintain the second monitoring state St2. If the sampling results do not match, the CAN communication unit 53 notifies the processing unit 51 that abnormality is detected, and terminates the monitor processing. It is noted that, in the case where the monitor processing is terminated, the CAN communication unit 53 may come out of the state transition illustrated in FIG. 5, or may maintain the second monitoring state St2. If the transition condition 3 is satisfied, the CAN communication unit 53 initializes the value of the counter to 0, and makes a transition to the synchronized state St0.

By the CAN communication unit 53 thus performing processing while making transitions among three states, a change in signals on the CAN bus may be monitored while PBS1 and PBS2 in one bit of a message are regarded as monitoring periods, and abnormality related to communication may be detected.

Figure 6:
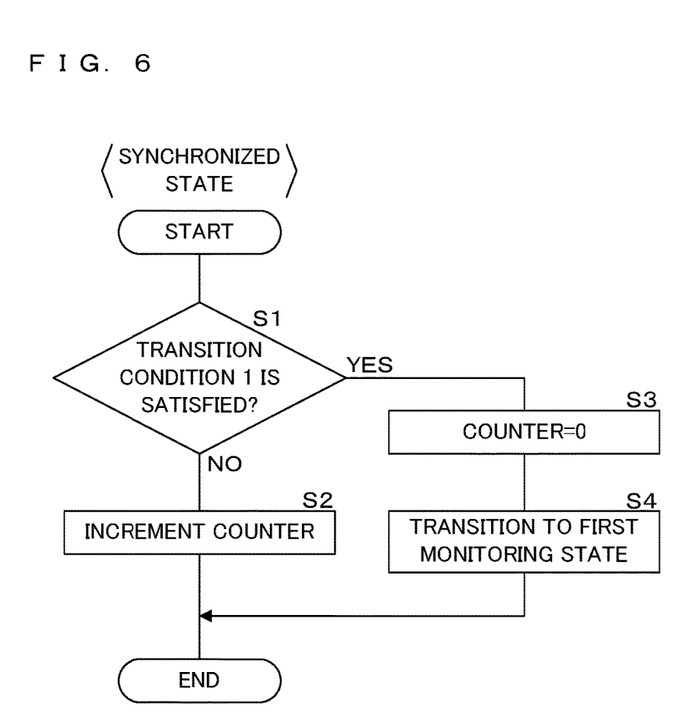
FIG. 6 is a flowchart illustrating a procedure of processing performed in a synchronized state by the monitoring device.

FIG. 6 is a flowchart illustrating a procedure of processing performed in the synchronized state St0 by the monitoring device 5. It is noted that the CAN communication unit 53 in the monitoring device 5 executes processing shown in the present flowchart in synchronization with a sampling clock, for example, at a frequency of one time per 1 Tq. The CAN communication unit 53 in the synchronized state St0 determines whether or not the transition condition 1 is satisfied (step S1). If the transition condition 1 is not satisfied (S1: NO), the CAN communication unit 53 increments the counter (step S2), and terminates the processing. If the transition condition 1 is satisfied (S1: YES), the CAN communication unit 53 initializes the value of the counter to 0 (step S3), makes a transition to the first monitoring state St1 (step S4), and terminates the processing.

Figure 7:
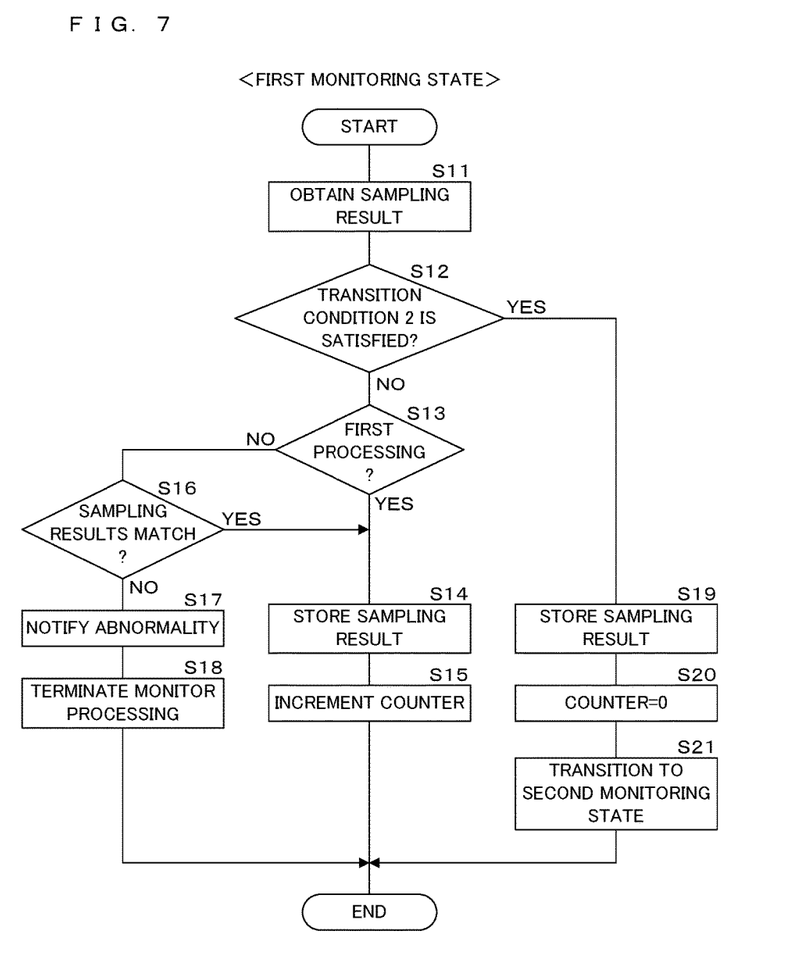
FIG. 7 is a flowchart illustrating a procedure of processing performed in a first monitoring state by the monitoring device.

FIG. 7 is a flowchart illustrating a procedure of processing performed in the first monitoring state St1 by the monitoring device 5. In the first monitoring state St1, the CAN communication unit 53 samples a signal on the CAN bus by the sampling part 56, and obtains a sampling result (step S11). Subsequently, the CAN communication unit 53 determines whether or not the transition condition 2 is satisfied (step S12).

If the transition condition 2 is not satisfied (S12: NO), the CAN communication unit 53 determines whether or not the processing is the first processing in the first monitoring state St1 based on the value of the counter (step S13). If it is the first processing (S13: YES), the CAN communication unit 53 stores the sampling result obtained at step S11 in an internal register or the like (step S14), increments the counter (step S15), and terminates the processing.

If it is not the first processing, i.e., is the second or later processing (S13: NO), the CAN communication unit 53 compares the previous sampling result with the current sampling result, and determines whether or not the sampling results match with each other (step S16). If the sampling results match (S16: YES), the CAN communication unit 53 stores the sampling result obtained at step S11 in an internal register or the like (step S14), increments the counter (step S15), and terminates the processing.

If the sampling results do not match (S16: NO), the CAN communication unit 53 notifies the processing unit 51 that abnormality is detected (step S17). The CAN communication unit 53 terminates the monitor processing (step S18), and terminates the processing in the first monitoring state St1.

If the transition condition 2 is satisfied (S12: YES), the CAN communication unit 53 stores the sampling result obtained at step S11 in an internal register or the like (step S19), and initializes the value of the counter to 0 (step S20). The CAN communication unit 53 makes a transition to the second monitoring state St2 (step S21), and terminates the processing.

Figure 8:
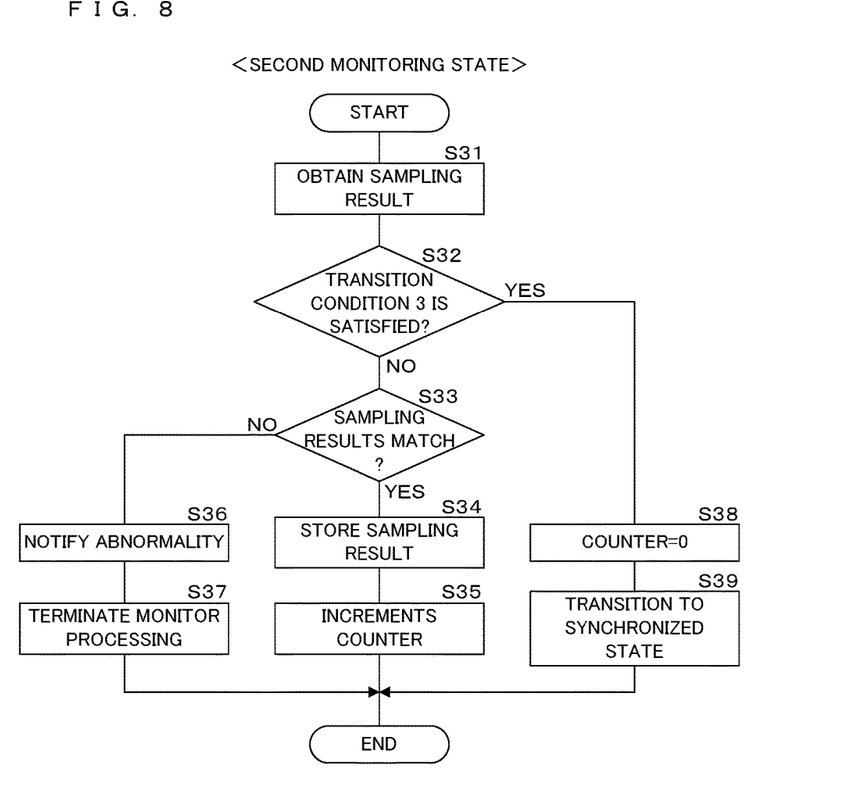
FIG. 8 is a flowchart illustrating a procedure of processing performed in a second monitoring state by the monitoring device.

FIG. 8 is a flowchart illustrating a procedure of processing performed in the second monitoring state St2 by the monitoring device 5. In the second monitoring state St2, the CAN communication unit 53 samples a signal on the CAN bus by the sampling part 56, and obtains a sampling result (step S31). Subsequently, the CAN communication unit 53 determines whether or not the transition condition 3 is satisfied (step S32).

If the transition condition 3 is not satisfied (S32: NO), the CAN communication unit 53 compares the previous sampling result with the current sampling result, and determines whether or not the sampling results match with each other (step S33). If the sampling results match (S33: YES), the CAN communication unit 53 stores the sampling result obtained at step S31 in an internal register or the like (step S34), increments the counter (step S35), and terminates the processing.

If the sampling results do not match (S33: NO), the CAN communication unit 53 notifies the processing unit 51 that abnormality is detected (step S36). The CAN communication unit 53 terminates the monitor processing (step S37), and terminates the processing in the second monitoring state St2.

If the transition condition 3 is satisfied (S32: YES), the CAN communication unit 53 initializes the value of the counter to 0 (step S38), makes a transition to the synchronized state St0 (step S39), and terminates the processing.

<Conclusion>

In the communication system according to the present embodiment, for the system configuration where a plurality of ECUs 3 transmit and receive information via a common communication line, abnormality detection related to communication is performed by the monitoring device 5 connected to the communication line. Each of the ECUs 3 receives information by sampling once at a predetermined timing during a transmission period of one-bit information. The plurality of ECUs 3 may however be allowed to perform sampling at different timings. The monitoring device 5 samples the voltage of the communication line multiple times over a predetermined monitoring period including a timing of the earliest sampling and a timing of the latest timing performed by the ECUs 3 during the transmission period of one-bit information. The monitoring device 5 may monitor a change in voltage of the common communication line over a period in which the plurality of ECUs 3 included in the communication system may perform sampling, and detect abnormality based on the results of multiple times of sampling.

The monitoring device 5 periodically performs sampling multiple times during a predetermined monitoring period and if the current sampling result is different from the previous sampling result, i.e. if a signal on the communication line changes during the predetermined period, determines that abnormality occurs in communication. Thus, information forgery may be detected by changing signals to be in accordance with the timing of sampling performed by a specific ECU 3.

Moreover, the monitoring device 5 notifies the plurality of ECUs 3 if abnormality related to communication is detected. The monitoring device 5 may notify the ECUs 3 of the occurrence of abnormality by performing predetermined information transmission by, for example, outputting an error frame in the CAN protocol to the communication line. Furthermore, according to the present communication system, the information transmission for notification of abnormality by the monitoring device 5 blocks reception of information by each ECU 3 in the communication system. This can prevent the ECUs 3 from receiving forged information.

While the present embodiment employs a configuration where the monitoring device 5 stores information, such as the length of a segment and timing of sampling in each ECU 3, in the storage unit 52 as timing information 52a, the configuration is not limited thereto. For example, the monitoring device 5 may be configured not to store information such as timing for each ECU3 but to simply store the setting of a monitoring period. While a period obtained by adding PBS1 to PBS2 is employed as the monitoring period in the present embodiment, the monitoring period is not limited thereto. The monitoring period may be so set as to include the earliest sampling timing as a starting time point and the latest sampling timing as an ending time point, or may be a period other than that described. Moreover, while the monitoring device 5 is configured to perform sampling by the unit of Tq (i.e., one sampling per 1 Tq) during the monitoring period, it is not limited thereto. The monitoring device 5 may be configured to perform sampling by the unit of clocks generated by the processing unit 31, CPU or the like, for example, or may be configured to perform sampling at other cycles.

While the monitoring device 5 is configured to detect abnormality by comparing a previous sampling result with a current sampling result during the monitoring period, the configuration is not limited thereto. The monitoring device 5 may, for example, hold the first sampling result for one monitoring period, compare the first sampling result with the current sampling result, and determine that abnormality occurs if the current sampling result is different from the first sampling result. The monitoring device 5 may compare the current sampling result with the previous sampling result, and determine that abnormality occurs if the current sampling result is different from the previous sampling result.

Furthermore, the communication system according to the present embodiment is so configured that the monitoring device 5 different from the ECU 3 detects abnormality, while the configuration is not limited thereto. Any one or more of the ECUs 3 included in the communication system may be provided with a function of detecting abnormality. Moreover, while the monitoring device 5 is configured to transmit an error frame and to notify the ECU 3 of abnormality related to communication upon detection of the abnormality, it is not limited thereto but notification of abnormality may be issued by a method other than the transmission of the error frame. According to the present embodiment, while description is made to the communication system mounted to the vehicle 1, the communication system is not limited to the one mounted to the vehicle 1 but may also be a system mounted to a movable object such as an airplane or a vessel, or may be installed in a factory, an office, a school or the like, not in a movable object.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A communication system comprising^ a plurality of communication devices connected via a common communication line to transmit and receive binary information through the communication line, each of the communication devices including a reception part receiving information by sampling voltage of the communication line once at a predetermined timing during a transmission period of one-bit information, and the plurality of communication devices being allowed to perform sampling at different timings, the system further comprising:
   an abnormality detection device connected to the communication line, including a sampling part sampling voltage of the communication line a plurality of times over a predetermined period including a timing of earliest sampling and a timing of latest sampling in sampling performed by the plurality of communication devices, wherein the predetermined period is shorter than the transmission period of one-bit information, and
   a detection part detecting abnormality concerning communication based on a plurality of sampling results obtained by the sampling part, wherein an abnormality is determined if a sampling result of sampling performed by the sampling part is different from a previous sampling result.

2. The communication system according to claim 1, wherein
   the sampling part periodically performs sampling a plurality of times during the predetermined period, and
   the detection part is configured to detect abnormality concerning communication if a sampling result of sampling performed by the sampling part is different from a previous sampling result.

3. The communication system according to claim 1, wherein the abnormality detection device includes a notification part notifying the plurality of communication devices that abnormality is detected if the detection part detects abnormality.

4. The communication system according to claim 3, wherein the notification part performs predetermined information transmission to the communication line if the detection part detects abnormality, and the information transmission blocks reception of information by the plurality of communication devices.

5. An abnormality detection device detecting abnormality concerning communication, in a communication system comprising a plurality of communication devices connected to each other via a common communication line to transmit and receive binary information through the communication line, each of the communication devices including a reception part receiving information by sampling voltage of the communication line once at a predetermined timing during a transmission period of one-bit information, and the plurality of communication devices being allowed to perform sampling at different timings, the abnormality detection device being connected to the communication line, and comprising:
   a sampling part sampling voltage of the communication line a plurality of times over a predetermined period including a timing of earliest sampling and a timing of latest timing in sampling performed by the plurality of communication devices, wherein the predetermined period is shorter than the transmission period of one-bit information: and
   a detection part detecting abnormality concerning communication based on a plurality of sampling results obtained by the sampling part, wherein an abnormality is determined if a sampling result of sampling performed by the sampling part is different from a previous sampling result.

6. An abnormality detection method detecting abnormality concerning communication, in a communication system comprising a plurality of communication devices connected to each other via a common communication line to transmit and receive binary information through the communication line, each of the communication devices including a reception part receiving information by sampling voltage of the communication line once at a predetermined timing during a transmission period of one-bit information, and the plurality of communication devices being allowed to perform sampling at different timings,
   sampling voltage of the communication line a plurality of times over a predetermined period including a timing of the earliest sampling and a timing of the latest timing in the sampling performed by the plurality of communication devices, wherein the predetermined period is shorter than the transmission period of one-bit information: and
   detecting abnormality concerning communication based on the plurality of sampling results, wherein an abnormality is determined if a sampling result of sampling performed by the sampling part is different from a previous sampling result.

* * * * *